(12) United States Patent
Skans et al.

(10) Patent No.: US 10,956,781 B2
(45) Date of Patent: Mar. 23, 2021

(54) METHOD, COMPUTER PROGRAM PRODUCT AND DEVICE FOR TRAINING A NEURAL NETWORK

(71) Applicant: Axis AB, Lund (SE)

(72) Inventors: Markus Skans, Lund (SE); Niclas Danielsson, Lund (SE)

(73) Assignee: Axis AB, Lund (SE)

( * ) Notice: Subject to any disclaimer, the term of this patent is extended or adjusted under 35 U.S.C. 154(b) by 142 days.

(21) Appl. No.: 15/840,868

(22) Filed: Dec. 13, 2017

(65) Prior Publication Data

US 2018/0165546 A1 Jun. 14, 2018

(30) Foreign Application Priority Data

Dec. 13, 2016 (EP) .................................. 16203595

(51) Int. Cl.
*G06K 9/62* (2006.01)
*G06N 3/08* (2006.01)
*G06N 3/04* (2006.01)

(52) U.S. Cl.
CPC ......... *G06K 9/6255* (2013.01); *G06K 9/6234* (2013.01); *G06K 9/6256* (2013.01); *G06K 9/6262* (2013.01); *G06N 3/0454* (2013.01); *G06N 3/08* (2013.01); *G06N 3/084* (2013.01)

(58) Field of Classification Search
None
See application file for complete search history.

(56) References Cited

U.S. PATENT DOCUMENTS

| | | | |
|---|---|---|---|
| 8,559,684 B1* | 10/2013 | Nechyba | G06K 9/00926 382/118 |
| 9,720,934 B1* | 8/2017 | Dube | G06F 16/583 |
| 9,798,742 B2* | 10/2017 | Cardonha | G06N 5/048 |
| 10,025,950 B1* | 7/2018 | Avasarala | G06K 9/00281 |
| 2004/0109584 A1* | 6/2004 | Lestideau | G06K 9/00228 382/103 |
| 2015/0062321 A1* | 3/2015 | Mankowski | G06K 9/00375 348/78 |
| 2016/0070986 A1 | 3/2016 | Chidlovskii et al. | |
| 2017/0109652 A1* | 4/2017 | Stein | G06N 20/00 |
| 2018/0032796 A1* | 2/2018 | Kuharenko | G06T 1/20 |
| 2018/0181813 A1* | 6/2018 | Sun | G06K 9/00711 |

OTHER PUBLICATIONS

V. Hegde, S. Usmani, "Parallel and Distributed Deep Learning" in Tech. report Stanford University, Jun. 2016.*
"Towards the Design of an End-to-End Automated System for Image and Video-based Recognition"; Chellappa et al., 2016 Information Theory and Applications Workshop (ITA), IEEE (Jan. 31, 2016), pp. 1-7, XP033082430.

(Continued)

*Primary Examiner* — Jiangeng Sun
(74) *Attorney, Agent, or Firm* — Volpe Koenig

(57) ABSTRACT

A method, device and computer program product for training neural networks being adapted to process image data and output a vector of values forming a feature vector for the processed image data. The training is performed using feature vectors from a reference neural network as ground truth. A system of devices for tracking an object using feature vectors outputted by neural networks running on the devices.

9 Claims, 4 Drawing Sheets

(56) References Cited

OTHER PUBLICATIONS

"Transferring Rich Feature Hierarchies for Robust Visual Tracking"; Wang et al. (Jan. 19, 2015), XP055326333; Retrieved from the Internet: URL:https://pdfs.semanticsholar.org/e3c4/33ab9608d7329f944552ba1721e277a42d74.pdf.
"OpenFace: A general-purpose face recognition library with mobile applications"; Amos et al. (Jul. 18, 2016); XP055378815,Retrieved from the Internet: URL:http://reports-archive.adm.cs.cmu.edu/anon/2016/CMU-CS-16-118.pdf.
"Multi-View 3D Object Retrieval With Deep Embedding Network"; Guo et al. (Oct. 3, 2016), IEEE Transactions on Image Processing, IEEE Service Center, Piscataway, NJ, US, vol. 25, No. 12; XP011624933.
"FaceNet: A Unified Embedding for Face Recognition and Clustering"; Schroff et al., 2015 IEEE Conference on Computer Vision and Pattern Recognition (CVPR), IEEE (Jun. 7, 2015), pp. 815-823; XP032793492.
"Neural Network Based Video Surveillance System"; Amato et al., CIHSPS 2005. Proceedings of the 2005 IEEE International Conference on Computational Intelligence for Homeland Security and Personal Safety, Orlando, FL, USA (Mar. 31, 2005), pp. 85-89, XP010830669.
"Domain-Adversarial Training of Neural Networks", Ganin et al.; Journal of Machine Learning Research 17 (2016), pp. 1-35; arXiv:1505.07818v4 [stat.ML] May 26, 2016.
Return of Frustratingly Easy Domain Adaptation; Sun et al., Computer Science, Computer Vision and Pattern Recognition; arXiv:1511.05547 v2 [cs.CV] Dec. 9, 2015.
EP 16203595.0 European Search Report (dated Jun. 22, 2017).
"FitNets: Hints for Thin Deep Nets"; Romero et al.; arXiv:1412.6550v4 [cs.LG] Mar. 27, 2015; pp. 1-13.

\* cited by examiner

METHOD, COMPUTER PROGRAM PRODUCT AND DEVICE FOR TRAINING A NEURAL NETWORK

FIELD OF INVENTION

The present teachings relate to a method, device and computer program product for training neural networks being adapted to process image data and output a vector of values forming a feature vector for the processed image data. The present teachings further relate to a system of devices for tracking an object using feature vectors outputted by neural networks running on the devices.

BACKGROUND

When training a neural network, many different details around the training and the neural network (e.g., the architecture of the neural network, etc.) affects how a multi-dimensional space is formed by the network. The mapping of an input data on this multi-dimensional space will form a feature vector for that specific input data.

The goal for the neural network is to set up the multi-dimensional space (hyperspace) such that similar input data (i.e., input data belonging to the same identity or the same class, depending on what similarities among the input data the neural network is trained to identify) will be mapped close together in this space, while different input data (i.e., input data belonging to different identities/classes) will be mapped away from each other. However, how this multi-dimensional space is formed depends on any one or a combination of the following examples: which training input data is used, and in which order they are inputted to the network; the type of neural network that is used, what cost function (also known as loss function or error function) that is implemented, the number of layers of nodes etc.; the hardware architecture of the device running the neural network when trained, (e.g., how float numbers are rounded, multiplied etc.), in that hardware; compression of input data, or other optimizations for calculation speed; randomized initialization of network weights; and so on.

Moreover, the training cost function (or optimization cost function) of a neural network often comprises some sort of stochastic function, making the training of two neural networks inherently different.

This means that even if independent training of two different networks is done in exactly the same way, using the same training input data in the same order, there is no guarantee that a feature vector produced by one neural network for a certain input data can be compared with a feature vector produced by another neural network for the same input data.

There is thus a need for improvements within this context.

SUMMARY

In view of the above, an object of the disclosure is to solve or at least reduce one or several of the drawbacks discussed above. Generally, the above objective is achieved by the attached independent patent claims.

According to a first aspect, a method for training a first neural network being adapted to process image data and output a vector of values forming a feature vector for the processed image data is provided. The method comprises: retrieving a reference feature vector, the reference feature vector being calculated by processing a first training image by a reference neural network, the reference neural network being adapted to process image data and output a vector of values forming a feature vector for the processed image data; and training the first neural network to optimize a cost function, the cost function comprising at least a first distance measure between the reference feature vector and a feature vector outputted by the first neural network when processing the first training image, wherein the cost function is adapted to minimize the first distance measure.

By the term "neural network" should, in the context of present specification, be understood interconnected groups of nodes, inspired by the vast network of neurons in a brain. Neural network may also be named "artificial neural network" (ANN). The term "deep learning" is also commonly used. A specific type of neural network that may be used in this context is a convolutional neural network (CNN) but any other type of feedforward neural network (FNN) may be used. Also, other types such as recurrent neural network (RNN) or deep belief network (DBN) may be used.

By the term "feature vector", should, in the context of present specification, be understood a vector in a multi-dimensional space which has been designed by the neural network performing the analysis during the training of the neural network. The dimensions in the space are most commonly not graspable for humans, as they describe the visual features which the neural network has experienced as the most useful during the identification or classification training. In this context, for example, the feature vector (also known as appearance vector) thus describes the visual appearance of an object in the image data which the neural network has processed. The multi-dimensional space has been designed to cluster input data of a similar kind, and to separate input data of a different kind. Depending on what purpose the neural network has been designed for, "similar kind" and "different kind" mean different things. The most common case for neural networks designed for monitoring purposes is to perform identification of objects (e.g., persons) in images processed by the neural network. In this context, input data of similar kind means input data comprising persons of the same identity, while input data of different kind means input data comprising persons of different identity. The neural network is in this case designed to identify persons, and cluster input data showing persons of the same identity, even if, for example, the images has been taken from different angles etc. In other embodiments, the neural network has been trained to cluster input data of the same class (a distribution into groups, as classes, orders, families, etc., according to some common relations or attributes), for example, dogs of the same breed or separate (e.g., cars from bicycles). In this context, input data of similar kind means input data comprising objects of the same class, while input data of different kind means input data comprising objects of different class. In other words, the aim is to let the feature vector characterize the aspects of the visual appearance relevant for the analytics task that the network was trained for, (e.g., for person re-identification). The feature vector contains invariant aspects between individuals that makes it possible to tell if two images depict the same person or not, but the dependence on appearance differences due to any one or a combination of pose/angles, lighting differences, sharpness of images, etc., are suppressed as much as possible in the feature vectors.

In the context of neural networks, such networks are trained using a cost function, which the learning process attempts to optimize (often minimize but it the cost function could also be designed to be maximized). Generally, the neural networks need to be trained to process the data according to the needs of the users as described above. The neural network should be trained to optimize performance with respect to the cost function. During training of the neural network, the learning algorithm depend upon the gradients of the cost function to find a minimum (or maxima) of the cost function. The minimum found may in some cases be a local minimum. So, in the context of the present embodiment, in case the distance measure between the reference feature vector and a feature vector outputted by the first neural network is large, the cost will be large and the weights of the first neural network is updated to make the cost smaller (according to the gradient of the cost function).

As described above, when training a neural network, many different details around the training and the design/ architecture of the neural network affects how the multi- dimensional space is formed by the network. The values of the output feature vector for each input image data are dependent on how the space is formed.

With the present embodiment, feature vectors from image data that was processed by neural networks implemented on different devices can be compared. For example, the feature vectors can be compared even if the architecture of the hardware of the devices or the architecture of the neural networks differs. This is possible since the output from a reference neural network has been used as a ground truth when training the neural networks. By training the first neural network using feature vectors (i.e., reference feature vectors) outputted from the reference neural network (can also be called common neural network, second neural network, etc.), the multi-dimensional space of the first neural network will converge towards the multi-dimensional space of the reference neural network. The reference neural network will thus have a normalizing effect on any neural network trained as described herein.

A further advantage of the present embodiment is that the implementation of the first neural network, (e.g., choice of architecture, number of nodes, type of neural network etc.), can be done without considering, or knowing about, the specifics of the reference neural network. Furthermore, a plurality of first networks can be trained, without any details of each other, or even without knowing of each other's existence, and still produce comparable output feature vectors since the multi-dimensional space of each neural network will be similar.

A further advantage of the present embodiment is that the reference neural network can be trained to a desired accuracy, for example, using a vast number of training images, or be implemented on a device adapted for producing very accurate results (the "best" architecture). Another advantage may be that no time constrains or hardware constrains exists for training the reference neural network, since this can be done offline on a dedicated device or well in advance of the training of the first neural network. The reference neural network can be kept a proprietary secret and does not need to be exposed, only the reference feature vectors need to be accessible for the first neural network.

According to some embodiments, the reference neural network has been trained using a triplet-based cost function, wherein the triplet-based cost function aims to separate a pair of input images of a same classification or identification from a third input image of another classification or identification, such that a difference between a first distance between the pair of input images of the same classification or identification, and a second distance between one of the pair of input images of the same classification or identification and the third input image, is at least a distance margin, alpha, wherein the step of training the first neural network to optimize the cost function comprises reducing the first distance measure to at least alpha divided by four.

By the term "triplet-based cost function", should, in the context of present specification, be understood a function for minimizing, or reducing, a distance between a first input image (also known as an anchor) comprising an object being of a first classification or identification and a second input image (also known as a positive) comprising an object being of the same classification or identification. The triplet-based cost function should further accomplish that a distance between the first input image and a third image (also known as a negative) comprising an object being of another classification or identification is at least alpha larger than the distance between the anchor-positive pair of input images. This means that the alpha value is used to create a difference in separation between anchor-positive and anchor-negative pairs such that, for a specific triplet of images, the distance between the anchor-negative pair is at least alpha larger than the distance between the anchor-positive pair. It should be noted that alpha is always a positive number. In case, the difference between the distance between the anchor-positive pair and the distance between the anchor-negative pair of a triplet is smaller than alpha, the cost function will change the weights of the neural network to increase the difference towards alpha. It should also be noted that reaching the alpha distance margin may be an iterative process. The triplet based cost function will change the weights such that the difference is increased towards alpha, but the alpha distance margin may not be reached in one iteration. It is an iterative process to meet all alpha conditions for all images in the training database and alpha distance margin is not achieved for a particular triplet, the gradients which is calculated based on the cost function to make the weights to change such that the particular triplet will come a little closer to meeting alpha margin. However, if the difference already is larger than alpha, the cost function will not affect the weights of the neural network for that specific triplet. Accordingly, separation of image data being of different classifications or identifications in the neural network hyperspace are achieved. Details of this alpha value are disclosed in published articles, for example in the article "FaceNet: A Unified Embedding for Face Recognition and Clustering" by Schroff et al. (Google Inc.).

Using the alpha value in the training of the first network, and reducing the distance between the feature vector of the first neural network and the reference feature vector retrieved from the reference neural network to at least alpha/4 may provide a good value for when the first neural network is "good enough", and where the training may be stopped, since an error of alpha/4 still means that an object of a specific classification will be classified in the correct class, albeit with an error compared to the reference vector. This will be further explained in conjunction with FIGS. 6-7 below. This embodiment may increase the speed of the training. According to some embodiments, the step of retrieving a reference feature vector comprises transmitting the first training image to the reference neural network, processing the first training image by the reference neural network, and retrieving the outputted feature vector from the reference neural network. In this way, the reference neural network need not have "seen", or have been trained on, the first training image before. The first training image may be an image specific for the image processing task of the first neural network (e.g. processing images captured at a subway station, or in an entrance of an office building etc.). The first training image may then be processed by the reference neural network which then returns the feature vector for retrieval by the first neural network.

According to some embodiments, the step of retrieving a reference feature vector comprises using data pertaining to the first training image as a key in a database comprising feature vectors, and retrieving the value corresponding to the key from the database. In this embodiment, a specific set of images have already been processed by the reference neural network and the resulting feature vectors have been stored in a database, using data (e.g., a fingerprint of the image such as a hash value) pertaining to the corresponding image as key. The training of the first neural network may thus comprise sending said data pertaining to the training image, or optionally the entire training image, to the database which optionally extracts the data to be used as key in the database (e.g., hash value) from the data received from the first neural network, and retrieving the feature vector which has previously been produced by the reference neural network (i.e., being the ground truth for training the first neural network) from the database. This embodiment may save time when training the first neural network, and also bandwidth since the entire training image according to some embodiments needs not to be transmitted.

According to some embodiments, the first distance measure is the Euclidian distance between the reference feature vector and the feature vector outputted by the first neural network. This is a computationally inexpensive distance measure. Alternatively, other distance measures such as any p-norm metric or measure may be used.

According to some embodiments, the first neural network and reference neural network are different types of neural networks. For example, different types of software libraries (e.g., Open Source) or network architectures may have been used. Example of such network architectures include GoogLeNet, AlexNet etc. Example of software libraries are TensorFlow, Caffe etc. According to other embodiments, the first and reference neural network comprises different quantities of layers, different quantities of nodes in each layer, etc. The term "different types of neural networks" further encompass different bit widths in the internal number representation of the first neural network and reference neural network, which otherwise may have the same network architecture. The term further encompasses a pruned (some small weights are set to zero to speed up calculation) but otherwise similar network, or a network using optimized functions for some of its operations (e.g., having specific functions doing optimized convolutions by using some tricks that may produce smaller accuracy errors) etc.

According to some embodiments, the first neural network is implemented by a device having a first hardware architecture, and the reference neural network is implemented by a device having a second hardware architecture being different from the first hardware architecture. As an example, the first neural network may be a very small integer neural network running on an embedded device while the reference neural network is large floating point network running in the cloud, or on a dedicated computing box.

According to some embodiments, the steps of any of the previous embodiments are iterated for a plurality of training images.

According to some embodiments, the method further comprises associating the first neural network with a version number, the version number reflecting a version number of the reference neural network at the time when the first neural network was trained with reference feature vectors from the reference neural network. Using version numbers as in this embodiment may facilitate knowing when there is a need to upgrade or re-train the first neural network.

In a second aspect, a computer-readable storage medium with instructions adapted to carry out the method of any embodiment of the first aspect when executed by a device having processing capability is provided.

In a third aspect, a device comprising a first neural network being adapted to process image data and output a vector of values forming a feature vector for the processed image data is provided. The device comprising a processor configured to: retrieve a reference feature vector, the reference feature vector being calculated by processing a first training image by a reference neural network, the reference neural network being adapted to process image data and output a vector of values forming a feature vector for the processed image data; and train the first neural network to optimize a cost function, the cost function comprising at least a first distance measure between the reference feature vector and the feature vector outputted by the first neural network when processing the first training image, wherein the cost function is adapted to minimize the first distance measure.

In a fourth aspect, a system comprising a plurality of device is provided. Each device comprises a first neural network trained according to the first aspect, wherein each device is further adapted to extract an object from an image, using the first neural network to process image data of the extracted object and transmit a feature vector outputted from the first neural network, wherein the system further comprises an object tracking unit adapted to receive feature vectors from the devices, and track an object through the system of devices based on the received feature vectors.

As described above, using a common, reference neural network for providing the reference feature vector for a training image, and using this for training other neural networks, the trained neural networks are steered to produce a similar multi-dimensional space, such that the output feature vectors from each neural network for a certain image can be compared in a meaningful way (since all feature vectors exist in the same, or very similar, vector space). Consequently, the feature vectors from different neural networks (implemented on different devices) can be compared and thus used for tracking an object.

According to some embodiments, the first neural network of each of the plurality of devices further is associated a version number, the version number reflecting a version number of the reference neural network at the time when the first neural network was trained, wherein the version number of a device of the plurality of devices is transmitted together with the feature vector outputted from the first neural network, and wherein the object tracking unit is adapted to track an object through the system of devices based on the received feature vectors and version numbers.

According to some embodiments, at least one of the plurality of devices is a network camera, wherein the object is extracted from an image captured by the network camera.

According to some embodiments, the object tracking unit is implemented in at least one of the plurality of devices, wherein the transmission of a feature vector from a device is implemented using multicast or broadcast transmission.

According to some embodiments, the object tracking unit is implemented in a further device separate from the plurality of devices and connected to each of the plurality of devices.

The second, third and fourth aspect may generally have the same features and advantages as the first aspect.

BRIEF DESCRIPTION OF THE DRAWINGS

A more detailed understanding may be had from the following description, given by way of example in conjunction with the accompanying drawings where.

DETAILED DESCRIPTION

Figure 1:
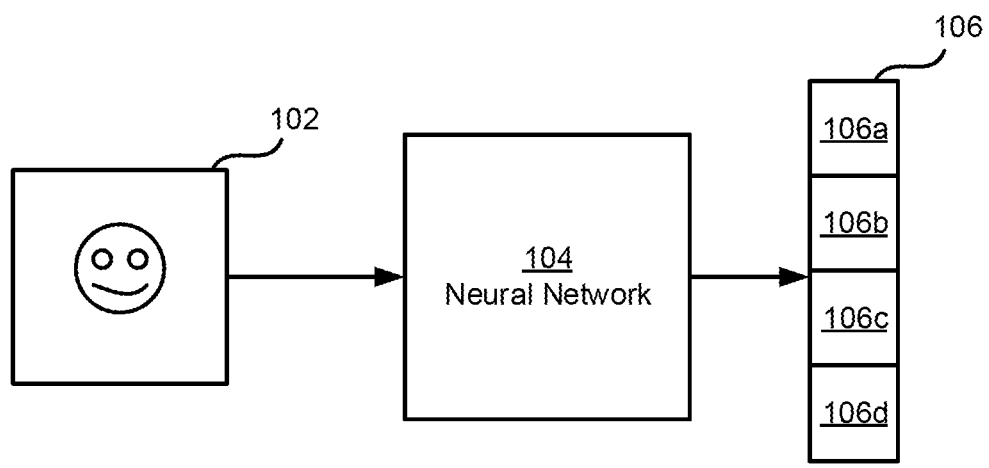
FIG. 1 shows a neural network processing an input image and outputting a feature vector describing the input image.

FIG. 1 shows by way of example functionality of a neural network 104. Using a neural network may be a good way of solving computer vision problems like object recognition where a rule based approach may not work well. It may be difficult to define distinguishing features of an (complex) object compared to other objects of another type (i.e., class) using a rule based approach, especially when it is not known beforehand what type of objects that need to be recognized and distinguishable from each other. Here lies one of the strengths of a neural network. When identifying or classifying objects with a neural network, the output may be a feature vector. This is shown in FIG. 1 where an input image 102 (or input image data 102) is processed by the neural network 104. The output from the neural network is a feature vector 106. In the example of FIG. 1, the dimensionality of the feature vector 106 is four, but this is only by way of example. The feature vector 106 describe the visual appearance of the object in the input image 102. The feature vector 106 is a vector in a multi-dimensional space which has been designed by the neural network 104 performing the analysis. The dimensions (four in number in this example, each represented by a value 106 a-d in the feature vector 106) in the space are most commonly not graspable for humans, as they describe the visual features which the neural network 104 has experienced as the most useful for identification or classification of objects and separation between objects of different identities/classes during the training of the neural network 104.

However, as described above, different neural networks may come up with different types of feature vectors (in different incomparable feature spaces) for the same objects.

Figure 2:
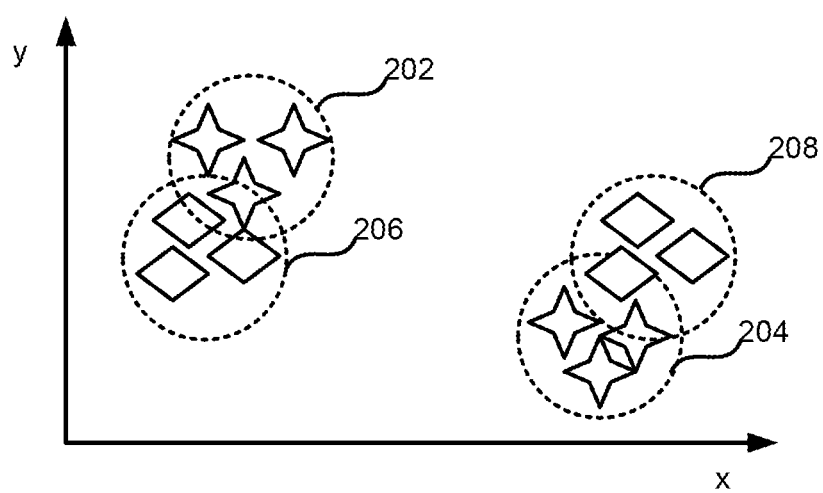
FIG. 2 shows feature vectors of two objects in a two-dimensional feature space processed by two different neural networks.

FIG. 2 shows by way of example mappings of two objects (shown as four-sided stars and diamonds in FIG. 2) made by two different neural networks in a two-dimensional space. In this simplified example, the two neural networks have outputted vectors of the same dimensionality. This is typically the case, but it is possible that vectors of different dimensionally is outputted by two different neural networks. Often, in order to achieve a good classification of complex objects using a neural network, 100-1000 dimensions are needed. In FIG. 2, two dimensions are used for simplicity. One neural network has classified the stars 202 to the left (lower x-values) and the diamond 208 to the right (higher x-values) in the two-dimensional space of FIG. 2, while the other neural network has classified to stars 204 to the right (higher x-values) and the diamonds 206 (lower x-values) to the left. If the feature vectors from the two neural networks for the two different objects would be used directly for comparing objects, the diamond of the first neural network would be matched to the star of the second network and vice versa. This may become a problem in a monitoring system where different monitoring cameras, video encoders and video servers (each having separate neural networks used for object classifications) are used to track objects (of the same identity or, in some less typical embodiments, class) over the monitoring system.

Figure 3:
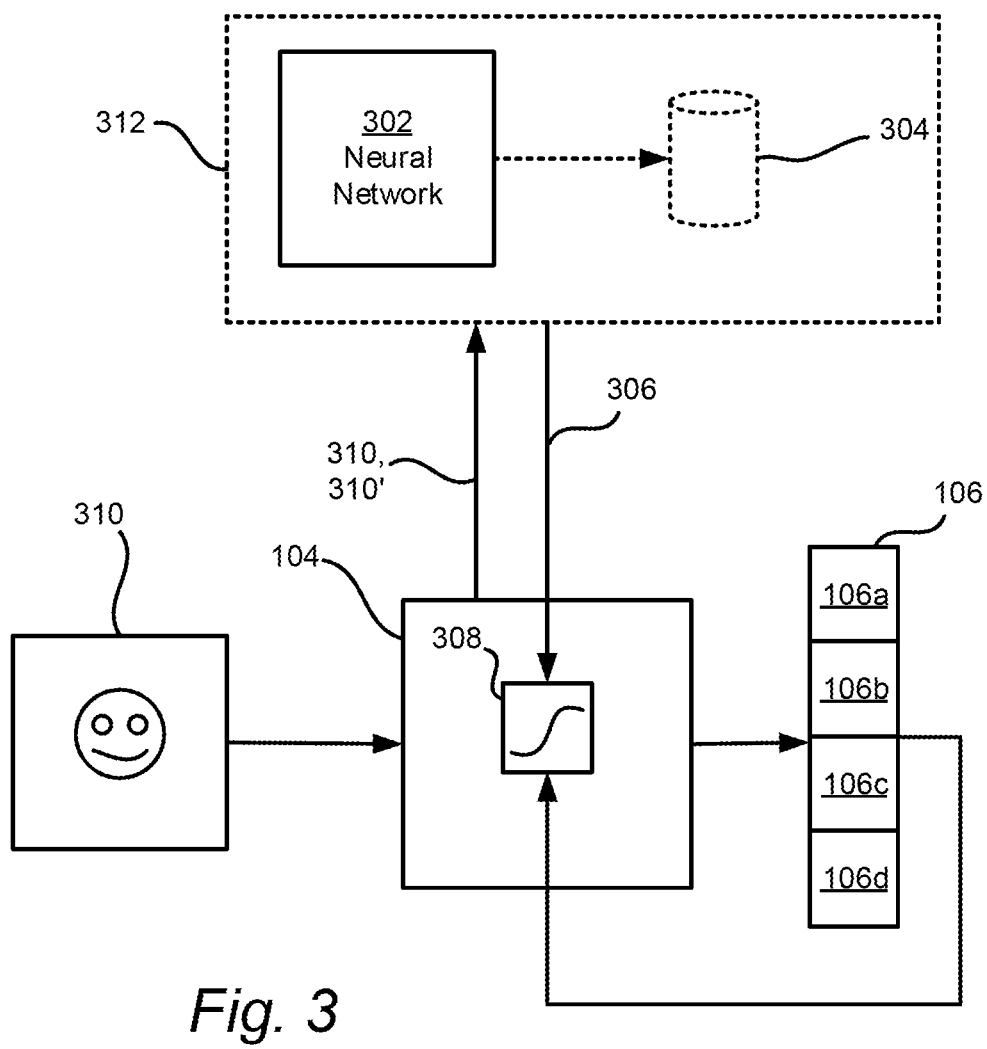
FIG. 3 shows training of a neural network according to embodiments.
Figure 5:
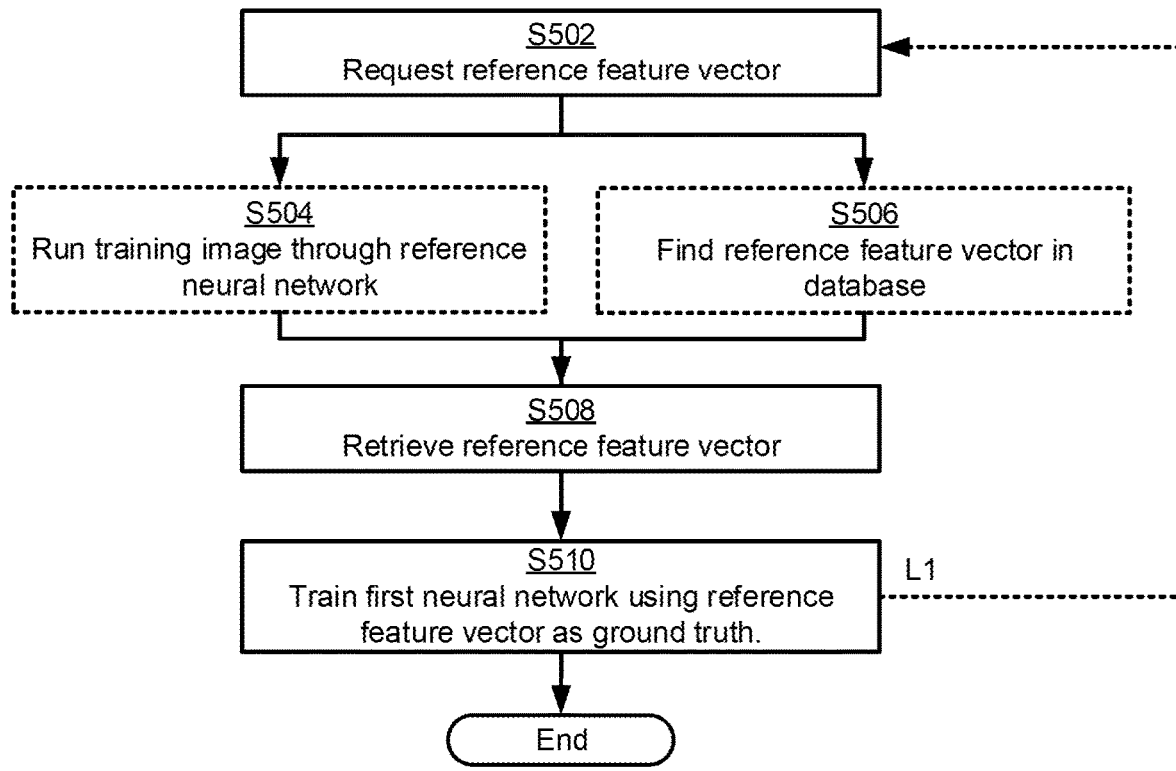
FIG. 5 shows a method for training a neural network according to embodiments.

The present disclosure provides a solution of this problem. In summary, the problem is solved by training the neural network(s) against a reference neural network. This will now be exemplified in conjunction with FIG. 3 and in FIG. 5. A first neural network 104 (i.e., the neural network to be trained) is adapted to process image data 310 and output a vector of values 106a-d forming a feature vector 106 for the processed image data 310. In order to "force" a feature vector 106 outputted for a specific input image data 310 to be comparable for neural networks having different architecture, or being trained using different training images, or being run on hardware with different specifications, a reference neural network (second neural network) 302 is used for the training. It is assumed that the reference neural network 302 is trained to a desired accuracy. During the training of the first neural network 104, no changes are performed to, for example, the weights of the reference neural network 302. For a training image 310, the first neural network 104 calculates a feature vector 106. Moreover, the first neural network 104 retrieves S508 a reference feature vector 306 which is used as the ground truth (i.e., correct feature vector) for this specific training image 310. This may be done by requesting S502 the reference feature vector for the training image 310 from, for example, a service 312 providing such reference feature vectors. According to some embodiments, retrieving a reference feature vector 306 comprises transmitting the first training image 310 to the reference neural network 302. The reference neural network 302 may then process S504 the first training image 310. The first neural network 104 can then retrieve S508 the outputted feature vector 306 (ground truth) from the reference neural network 302. For example, the service 312 providing reference feature vectors may transmit the reference feature vector 306 to the requesting neural network 104 when the reference feature vector 306 has been outputted by the reference neural network 302. This embodiment may for example facilitate training of the first neural network 104 with training images which the reference neural network 302 has not processed before. In other embodiments, retrieving the reference feature vector 306 comprises using data 310' pertaining to the first training image 310 and transmit this data 310' to the service 312 providing reference feature vectors. The data 310' may be any type of unique identifier of the training image 310, for example the entire training image 310, a hash value of the training image 310 or a predetermined identifier for the training image 310. The data 310' can then be used as a key in a database 304 (optionally, the data 310' is pre-processed at the service 312 to be in the correct format for the database, wherein the pre-processed data still will be data pertaining to the first training image 310) for finding the reference feature vector 306 for the training image 310 in the database 304. The database 304 has previously been provided with reference feature vectors and identifiers for each reference feature vector, where the reference feature vectors have been calculated by the reference neural network 302. In this embodiment, a predefined set of images has been determined and processed by the reference neural network 302, before training of the first neural network (using images from the predefined set of images for training) can be performed.

When the reference feature vector 306 has been retrieved, the first neural network 104 may be trained such that it will output feature vectors 106 comparable to the feature vectors outputted by the reference neural network 302. This is done by reducing a cost function 308 (schematically represented by the S-like symbol in FIG. 3), where the cost function 308 comprises at least a first distance measure between the reference feature vector 306 and the feature vector 106 outputted by the first neural network 104 when processing the first training image 310. The cost function is thus adapted, for example, by changing weights between neurons (nodes) in the neural network, to minimize the first distance measure such that the output feature vector 106 will be closer (more comparable) to the reference feature vector. The details of such a cost function are left to the skilled person to implement, but generally, the cost function is optimized to reach a minimum or maximum in which the first distance measure is, at least locally, minimized.

Consequently, the first neural network is trained to optimize the cost function, such that the cost function is adapted to minimize the distance between the output feature vector 106 and the reference feature vector 306. There may be performance limitations in how close the feature vectors from the first neural network and reference feature vectors might become, however, by using the above method for training neural networks, all neural networks trained against the same reference neural network may generate comparable feature vectors within some confidence level. According to some embodiments, data relating to the training of the reference neural network may be used for training the first neural network to a reasonable confidence level. Specifically, in case the reference neural network has been trained using so called triplet training, which comprises training using a pair of input images with a same identification or classification and a third input image with another identification/classification, the so called distance margin for such training can be used when training the first neural network. In this type of training, the cost function of the neural network aims to separate the pair of input images of the same identification/classification from the third input image of said another identification/classification with at least the distance margin, also called alpha.

Figure 6:
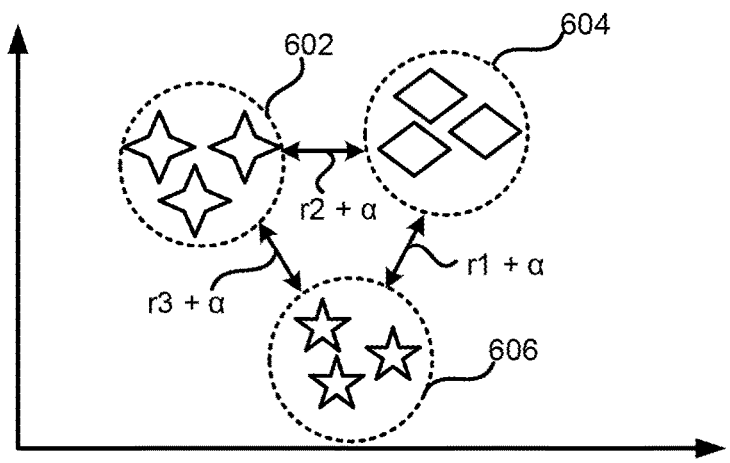
FIG. 6 shows a distance margin which is the smallest distance between clusters of images with the same classification mapped in the multi-dimensional space of the reference neural network.
Figure 7:
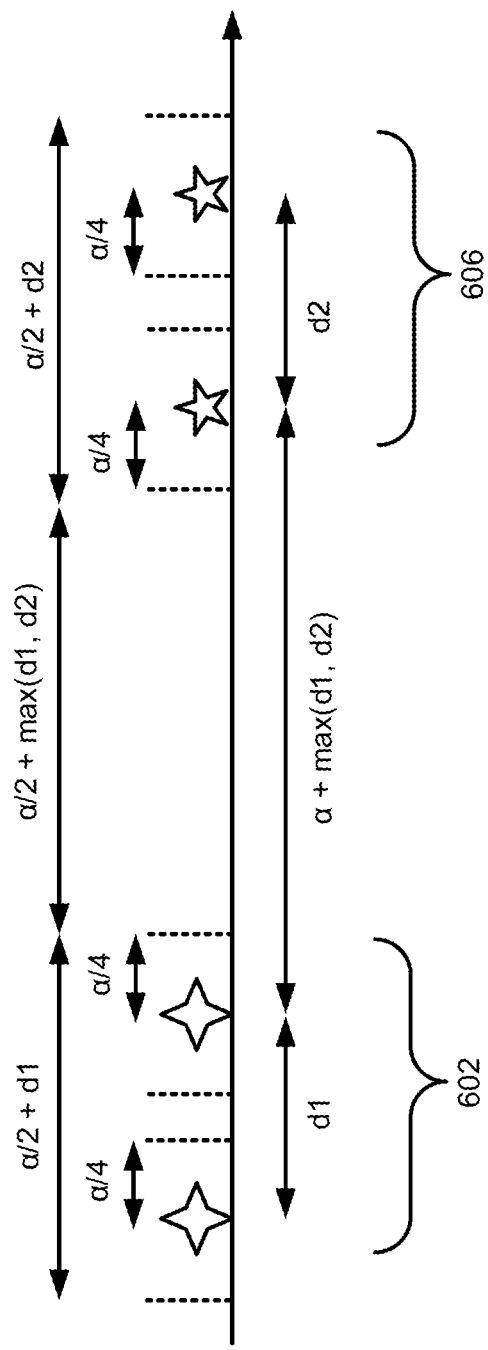
FIG. 7 shows the use of alpha value of the reference neural network when training the first neural network.

FIGS. 6-7 schematically describe the distance margin alpha α which in part determines the smallest distance between clusters of images with the same identification/classification mapped in the multi-dimensional space. As can be seen in FIG. 6, the distance between any of the three clusters 602-606 are alpha α+r1/r2/r3. The values r1 corresponds to max(distance between most separated feature vectors in cluster 604, distance between most separated feature vectors in cluster 606). In the same way, values r2/r3 depends on the spreading of the clusters 602, 604 and 602, 606 respectively. By the above described way of training the reference neural network using triplet training, the end result will, in a perfect scenario where all triplet combinations have been seen to fulfil the alpha requirement, become as described in FIG. 6 where the r1/r2/r3 distances represent the smallest distances such that all combinations of triplets selected from the clusters of images give zero error from the loss function. It should be noted that such perfect training almost never occurs, (i.e., where all combinations of triplets selected from the clusters of images give zero error from the loss function). For example, this is because it is not feasible to train on all triplet combinations since they are simply too many, and in any event, it cannot be guaranteed that the neural network ever will be able to converge to a state that is able to perform that well. FIG. 6 is however for a well-trained network likely to be a good enough approximation for the current discussion of the alpha value with respect to the accuracy of the training of the first network.

The separation of clusters 602-606 will thus differ, but all will in part be determined by the alpha value. In this embodiment, the step of training S510 the first neural network to optimize the cost function comprises reducing the first distance measure to at least alpha divided by four. This is the smallest distance in which it is still reasonable likely that the output feature for a specific input image data will result in a correct classification/identification (i.e., classified/identified as it would be using the reference neural network).

FIG. 7 shows, in a simplified way, the rationale behind the value training the first neural network to minimize the first distance measure to at least alpha divided by four. For ease of description, in FIG. 7, each image data has been processed and mapped to a single dimension space, (i.e., the outputted feature vector comprises one value). Two feature vectors for each cluster 602, 606 are shown, which represent the feature vectors furthest away from each other but still having the same identity/class, (i.e. most separated feature vectors in each cluster 602, 606). The distance between the feature vectors in the left cluster 602 is thus d1, and the distance between the feature vectors in the right cluster 606 is thus d1. As described above, the distance between the two closest feature vectors of different identities/classes in the multi-dimensional space is α+max(d1, d2). As shown in FIG. 7, this separation allows for some margin when training the first neural network, and still produces a correct identification/classification for the involved processed image data. The margin in this case is alpha/4. In case all feature vectors are off by alpha/4 in the "wrong way" such that the distance between the samples (e.g., stars in FIG. 7, representing the feature vector for each sample) in the same cluster 602, 604 is increased, and the distance between the "outer" samples in neighboring clusters is increased, the closest feature vectors of different identities/classes will still be further away from each other than the feature vectors within a same cluster 602, 604 which are furthest away from each other.

As described above, using the method for training the first neural network 104 may result in comparable feature vectors outputted from the first 104 and the second 302 neural network even though they for example are different types of neural networks. For example, the reference neural network may be implemented using a first network architecture, and the first neural network may be implemented using a different network architecture. Furthermore, using the method for training the first neural network 104 may result in comparable feature vectors outputted from the first 104 and the second 302 neural network even though the first neural network 104 is implemented by a device having a first hardware architecture, and the reference neural network 302 is implemented by a device having a second hardware architecture being different from the first hardware architecture. The training method is thus robust. For example, the training method is robust against different ways of rounding float values.

After the first training image has been used for training the first neural network, the above method (according to any embodiment) may be iterated (L1 in FIG. 5) for a plurality of training images.

According to some embodiments, the first neural network 104 may be associated with a version number, the version number reflecting a version number of the reference neural network 302 at the time when the first neural network was trained. This embodiment may be used to make sure that when feature vectors are compared between neural networks, the same version of the reference neural network (i.e., reference neural network 302) has been used for training. Otherwise, comparisons of the feature vectors cannot be done.

Figure 4:
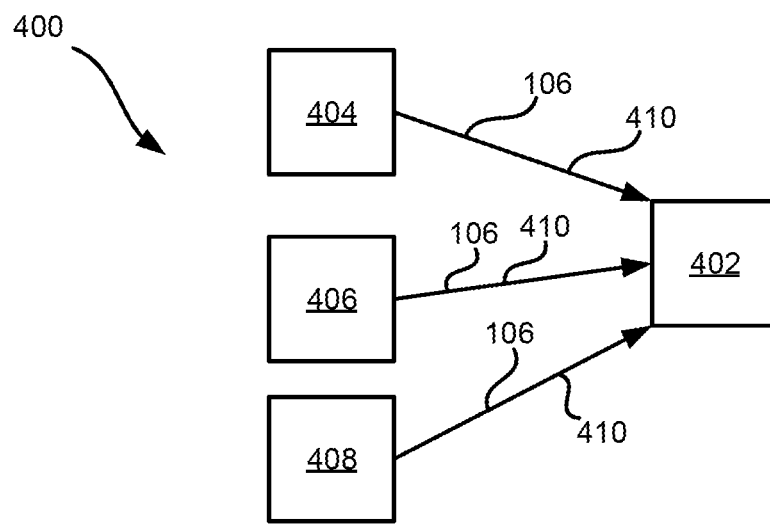
FIG. 4 shows a system of devices used for tracking an object captured by images.

FIG. 4 shows by way of example a system 400 comprising a plurality of devices 404-408, wherein each device 404-408 comprises a neural network trained according to this disclosure. The system 400 can thus be used for tracking an object between the devices, since the output feature vectors from the neural networks can be compared. For example, each device can be adapted to extract an object from an image, using the first neural network to process image data of the extracted object and transmit a feature vector 106 outputted from the first neural network. According to some embodiments, at least one of the plurality of devices is a network camera, wherein the object is extracted from an image captured by the network camera.

In the system 400, an object tracking unit 402 adapted to receive feature vectors from the devices may be used for tracking an object through the system of devices based on the received feature vectors 106. The object tracking unit 402 may be implemented in at least one of the plurality of devices, which means that the object tracking unit itself is a device similar to the plurality of devices 404-408 and also comprises a neural network trained as described herein. The system 400 may thus be a peer-to-peer network or any other suitable network architecture. In this case, the transmission of a feature vector 106 from a device of the plurality of devices 404-408 may be implemented using unicast, multicast or broadcast transmission. In other embodiments, the object tracking unit 402 is implemented in a further device separate from the plurality of devices 404-408 and connected to each of the plurality of devices 404-408. In this embodiment, the object tracking unit 402 may be implemented in a server or similar to facilitate a central handling of tracking of object. The transmission of feature vectors between the plurality of devices 404-408 and the separate object tracking unit 402 may thus be dedicated transmissions (i.e., to a dedicated receiver of the feature vector 106).

According to some embodiments, the first neural network of each of the plurality of devices further is associated a version number 410. As described above, the version number reflects a version number of the reference neural network at the time when the first neural network was trained. In this case, the version number 410 of a device of the plurality of devices 404-408 is transmitted together with the feature vector 106 outputted from the first neural network. The object tracking unit may thus be adapted to track an object through the system of devices based on the received feature vectors and version numbers, and make sure that only feature vectors received from devices having a neural network with the same version number is compared.

In case the version number 410 differs for a received feature vector 106, the object tracking unit 402 may disregard the feature vector. According to other embodiments, the object tracking unit may request another device 404-406, having the correct version number associated to its neural network, or for example, a server having implemented a neural network of associated with the correct version number, to re-process the image data being the cause of the feature vector with the wrong version number, and to transmit a new feature vector to the object tracking unit 402. The object tracking unit 402 may also trigger an update (re-training) of the neural network with the wrong (old) version number, and/or flag the device accordingly.

What is claimed is:

1. A system comprising:
a plurality of devices, each device comprising:
a first processor configured to:
operate a separate first neural network configured to process image data and output a vector of values forming a feature vector for the processed image data; and
a second processor configured to:
retrieve a reference feature vector, the reference feature vector being calculated by processing a first training image by a reference neural network, the reference neural network being configured to process image data and output a vector of values forming a feature vector for the processed image data;
train the first neural network of the device to optimize a cost function, the cost function comprising at least a first distance measure between the reference feature vector and a feature vector outputted by the first neural network when processing the first training image, wherein the cost function is configured to minimize the first distance measure, wherein the first neural network and the reference neural network are different neural networks; and
extract an object from an image, wherein the first neural network of the device processes image data of the extracted object and transmits a feature vector outputted from the first neural network; and
an object tracking server configured to:
receive one or more feature vectors from the plurality of devices; and
track an object through the plurality of devices at least partly based on the received feature vectors,
wherein the first neural network of each of the plurality of devices is associated with a version number, the version number reflecting a version number of the reference neural network at the time when the first neural network was trained, the version number associated to the first neural network of a device of the plurality of devices being transmitted with the feature vector outputted from the first neural network.

2. The system of claim 1, wherein the reference neural network has been trained using a triplet-based cost function, wherein the triplet-based cost function separates a pair of input images of a same classification or identification from a third input image of another classification or identification, such that a difference between a first distance between the pair of input images of the same classification or identification, and a second distance between one of the pair of input images of the same classification or identification and the third input image, is at least a distance margin, alpha, wherein the training the first neural network of each device to optimize the cost function comprises reducing the first distance measure to at least alpha divided by four.

3. The system of claim 1, wherein the retrieving a reference feature vector by the second processor of the device comprises transmitting the first training image to the reference neural network, processing the first training image by the reference neural network, and retrieving the outputted feature vector from the reference neural network.

4. The system of claim 1, wherein the retrieving a reference feature vector by the second processor of the device comprises using data pertaining to the first training image as an identifier in a database comprising reference feature vectors and identifiers for each reference feature vector, and retrieving the reference feature vector corresponding to the identifier from the database.

5. The system of claim 1, wherein the retrieving the reference feature vector and training the first neural network to optimize the cost function is iterative for a plurality of training images.

6. The system of claim 1, further comprising:
associating the first neural network with a version number, the version number reflecting a version number of the reference neural network at the time when the first neural network was trained with reference feature vectors from the reference neural network.

7. The system of claim 1, wherein each device has a first hardware architecture, and wherein the reference neural network is implemented by a device having a second hardware architecture being different from the first hardware architecture.

8. The system of claim 1, wherein the object tracking server is further configured to track the object through the system of devices based on the received feature vectors and version numbers.

9. The system of claim 8, wherein the object tracking server is further configured to track the object through the system of devices by comparing only feature vectors received from devices having a first neural network with a same version number.

* * * * *